May 10, 1949.    C. E. MUNSON    2,469,399
DISPOSABLE DISPENSING DEVICE
Filed April 17, 1945
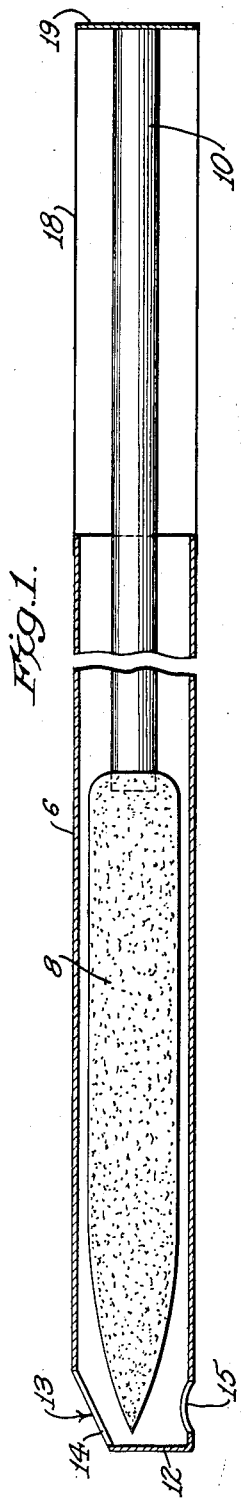
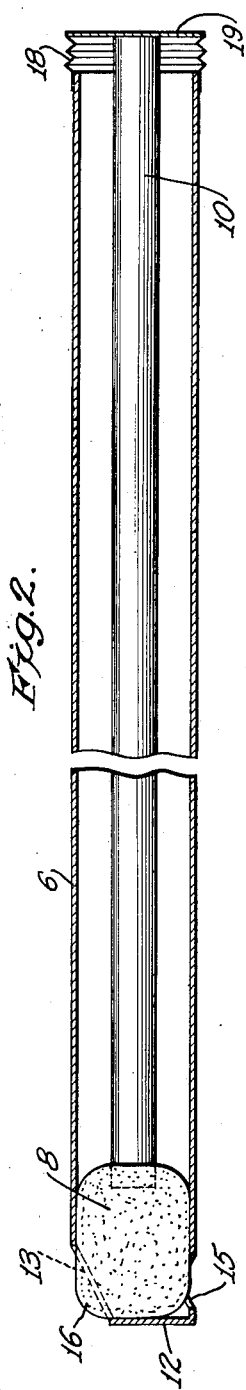
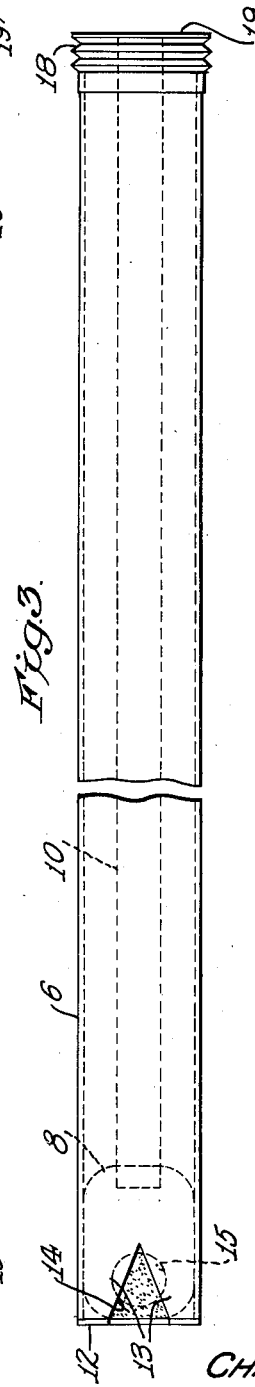
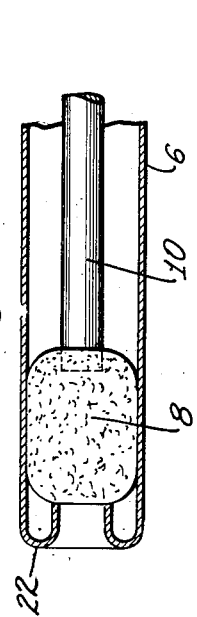
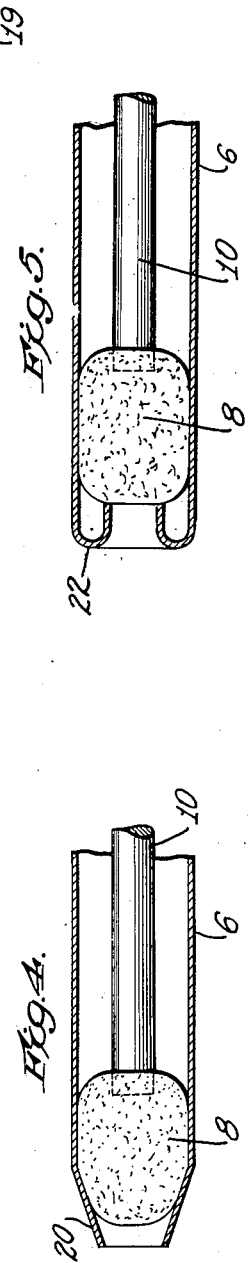
INVENTOR.
CHARLES E. MUNSON
BY
ATTORNEYS Patented May 10, 1949

2,469,399

UNITED STATES PATENT OFFICE 2,469,399

DISPOSABLE DISPENSING DEVICE

Charles E. Munson, Summit, N. J., assignor to Ciba Pharmaceutical Products, Inc., Summit, N. J., a corporation of New Jersey Application April 17, 1945, Serial No. 588,836

4 Claims. (Cl. 128—260)

This invention relates to liquid dispensing devices.

Liquid dispensing devices, such as those commonly known as "eye droppers" are not constructed so as to deliver a measured dosage. In the case of many medicines, such as certain "nose drops," it is important to administer a measured amount which is not exceeded. In addition, such droppers are generally intended for reuse and are constructed of glass, with this purpose in mind.

When the dropper is used by several persons it subjects them to cross contamination. This is very objectionable and particularly common in the case of ordinary glass nose droppers.

The main object of this invention is the provision of a single service dispensing device of this general character which delivers a measured dosage and which can be constructed so cheaply that the druggist may include a plurality of these devices with a container of medicine so as not to necessitate reuse of the device.

Another object of the invention is the provision of such a device in which the amount of liquid dispensed can be more accurately predetermined, in which the liquid may be dispensed independently of the formation of drops which may differ in volume due to various conditions, and which may be readily manufactured in different sizes to dispense different amounts with the advantage that a liquid to be dispensed in definite quantity may be accompanied by dispensing devices which will dispense the proper dosage so that the user will make no mistake in the amount of liquid used for each dose. Another object is to accomplish the above objects with a device which can be used once and then discarded without any substantial expense.

It is a further object in a preferred embodiment of the invention to provide a dispensing device with a protective closure at one end which will serve as an indicating means to indicate whether the device is in condition to receive the proper quantity of liquid and whether it has been used and which will also interfere with a reuse of the device.

Other objects of the invention will appear from the following description taken in connection with the drawings, in which:

Figure 1 is a longitudinal section through a preferred embodiment of the invention showing the parts in normal condition;

Figure 2 is a similar section showing the condition of the parts after the liquid has been dispensed;

Figure 3 is a bottom plan view of the device shown in Figures 1 and 2;

Figure 4 is a longitudinal section of a second form of the dispensing end showing the parts at the end of a dispensing operation; and Figure 5 is a similar section of a third form of the dispensing end showing the parts at the end of a dispensing operation.

The device, having reference to Figures 1, 2 and 3, comprises a body or barrel 6 preferably of tubular cylindrical form and having imperforate walls with an open or upper end and a lower end partially closed for retaining the parts assembled, and for other purposes as will appear later. The barrel 6 may be formed of waxed paper, such as an ordinary drinking straw. Alternatively, the barrel 6 may be made of transparent material, such as cellophane, if desired, in order that the condition of the interior parts may be observed. The barrel may be formed by winding sheet material or extruding a plastic. Any other material, such as a variety of plastics, may be used. The cost and the ease of manufacture will probably control in selecting the material in view of the fact that the device is to be destroyed once it is used and a new device is needed for each dose.

The absorbing body or mass 8 preferably comprises a length of absorbent cotton preferably of cylindrical form. It is also obvious that this invention is not limited to the use of absorbent cotton and that any other suitable porous or sponge-like material capable of absorbing liquid and of being compressed may be used in place of the absorbent cotton. The mass of absorbent cotton is shown in its normal extended condition in Figure 1 and compressed in Figures 2 and 3, and for the purpose of compressing this mass of absorbent cotton, a manipulative rod 10 of wood, plastic, or other material may be provided. This rod may be connected to one end of the mass of absorbent cotton in any suitable way, such as by a cement, in order to hold it centered with respect thereto. It is not essential that the rod be so connected, and it is obvious, of course, that other means may be provided to hold the rod in such position that it will always engage the end of the mass of cotton.

The closed end of the barrel 6 may be provided with an end wall comprising a section 12 arranged in a plane extending at right angles to the longitudinal axis of the barrel. The section 13 may be constituted by the edges of a triangular orifice 14, Figures 2 and 3, and opposite this orifice the body of the barrel may be provided with an orifice 15 so that when the closed end of the barrel is dipped into the liquid, the liquid may enter the barrel and be readily absorbed. It is not necessary that the entire barrel be immersed in the liquid, as the capillary action of the absorbent material causes it to absorb a given amount of liquid when the latter reaches the absorbent material through the orifices 13 or 15. When the absorbent mass 8 is compressed, as shown in Figures 2 and 3, the liquid is squeezed out and may flow out through the orifices 13 and 15 upon the area to be treated either as a stream or in drops, depending upon the position in which the device is held and whether or not the end of the device is in contact with the area to be treated.

If desired, after the liquid has been applied, it may be spread by means of the projecting portion 16 of the compressed mass of adsorbent cotton, as appears more clearly from Figure 2.

The dispensing end of the device may take the form shown in Figures 1, 2 and 3, or it may take other forms, one of which is shown at 20 in Figure 4 in which the end is tapered, the tapered wall of the end retaining the mass of cotton in position.

If desired, the end may be of the form shown at 22 in Figure 5, in which the edges of the end are turned inwardly and rearwardly, also providing a dispensing aperture and means for retaining the mass of absorbent cotton within the barrel.

The invention contemplates any construction in which the absorbent material is held at the end of the barrel so that it may be compressed but still can be contacted by liquid when the end of the barrel is immersed in liquid and permit liquid to exit when the absorbent material is compressed.

In constructing the device, the amount of absorbent material will determine the dosage for any given liquid depending on the characteristics of the absorbent material and the capillary properties of the liquid. The barrel may be of a diameter and length to accommodate the required amount of the absorbent material. For most uses the diameter may be about that of an ordinary drinking straw and may be several inches in length. This absorbent material may absorb and dispense about 1 to 5 drops of liquid, depending on the amount of absorbent material in the barrel.

In a preferred embodiment of the invention, the open end of the barrel 6 may be closed by a cylindrical member 18, which may be made of tissue paper or other readily deformable material, one end of which may be secured about the barrel 6 by any suitable means. The other end of the member 18 may be provided with a closure 19 which, in the normal position of the part shown in Figure 1, abuts the end of the rod 10 and, if desired, these two parts may be secured together or held against relative lateral movement by any suitable means.

When the device has been used, the parts will be in the position shown in Figures 2 and 3, in which case the material 18 will be collapsed, indicating that the device has been used. It is found desirable to proportion the parts so that when the device has been used, the outer end of the rod 10 will be located close to or within the open end of the barrel 6, making it difficult to seize the rod to withdraw it and to expand the mass of cotton or permit it to expand for reuse of the device.

In this embodiment of the invention, the undeformed material 18, as illustrated in Figure 1, shows that the device has not been used and that the parts are in correct position and relation for use. In this embodiment also it is not necessary to secure the lower end of the absorbent material to the lower end of the barrel nor to secure the rod 10 to the upper portion of the absorbent material. The absorbent material and the rod may be placed in the desired position during manufacture and will not be disturbed during ordinary handling prior to use.

When the material 18 is not included it is desirable to include means for preventing the accidental withdrawal of the absorbent material 8 or the rod 10. To accomplish this the lower portion of the absorbent material may be secured at the lower end of the barrel by a thread or by cement and this securing means may also function to prevent the absorbent material from being ejected from the end of the barrel upon compression. The upper portion of the absorbent material may be secured to the rod 10. Alternatively, coacting friction means on the interior of the barrel and on the rod 10 may hold the rod in position, or coacting flanges on the barrel and the rod may prevent the rod from falling out when the device is inserted.

All of the materials used in constructing the device should be relatively inert, both physically and chemically, with the liquid to be dispersed. Other than that they may be formed of any materials which will perform the functions described and which will permit manufacture inexpensively. These materials, such as paper, wood, cotton, cellophane and other materials of cellulosic origin or plastics are referred to as ephemeral materials as distinguished from metal, glass and other lasting materials.

While I have shown and described preferred embodiments of my invention for purposes of disclosure, it is to be understood that such disclosure is not to be considered limiting and that I reserve the right to all such changes as fall within the principles of this invention and the scope of the appended claims.

I claim:

1. A liquid dispensing and measuring device comprising a tubular container provided with a cone shaped end providing an orifice, a mass of liquid absorbing material within said container, means for compressing said material against said end to discharge absorbed liquid therefrom, and a tubular deformable member interposed between the other end of said container and said compressing means and adapted to be permanently deformed upon actuation of said compressing means in discharging liquid from said absorbent material, thereby providing a positive indication that the device has been used.

2. A liquid dispensing and measuring device comprising a tubular container having the wall at its forward end turned inwardly and rearwardly providing an orifice, a mass of liquid absorbing material within said container, means for compressing said material against said inturned wall end to discharge absorbed liquid therefrom, and a tubular deformable member interposed between the other end of said container and said compressing means and adapted to be permanently deformed upon actuation of said compressing means in discharging liquid from said absorbent material, thereby providing a positive indication that the device has been used.

3. A liquid dispensing and measuring device comprising a tubular container having an orifice at one end thereof, a mass of liquid absorbing material in the container and adapted to be charged by absorption of liquid through said orifice, means at the other end of said container and movable with respect to the container for applying pressure to one end of said mass, means at the other end of said mass for retaining the same within the container while pressure is being applied to said one end of the mass whereby said mass of material can be compressed, while retained within the container, to discharge absorbed liquid therefrom, and deformable means interposed between said other end of the container and said pressure applying means and adapted to be permanently deformed upon the actuation of said pressure applying means in discharging liquid from said absorbent material, thereby providing a positive indication that the device has been used.

4. A liquid dispensing and measuring device comprising an elongated container provided with a closed end including a portion inclined to the axis of said container, means forming an orifice in said end inclined portion, a mass of liquid absorbing material within said container, means for compressing said material and forcing a portion thereof to project through said orifice while the remainder of said material is retained within the container, and a tubular deformable member interposed between the other end of said container and said compressing means and adapted to be permanently deformed upon actuation of said compressing means in discharging liquid from said absorbent material thereby providing a positive indication that the device has been used.

CHARLES E. MUNSON.

REFERENCES CITED

The following references are of record in the file of this patent:

UNITED STATES PATENTS

| Number | Name | Date |
| --- | --- | --- |
| 977,825 | Murphy | Dec. 6, 1910 |
| 1,256,831 | Rogers | Feb. 19, 1918 |
| 1,794,221 | Washburn et al. | Feb. 24, 1931 |
| 1,908,403 | Budde | May 9, 1933 |
| 2,059,966 | Kaufman et al. | Mar. 3, 1936 |
| 2,072,327 | Friedman et al. | Mar. 2, 1937 |
| 2,224,018 | Holtman | Dec. 3, 1940 |

FOREIGN PATENTS

| Number | Country | Date |
| --- | --- | --- |
| 55,715 | Austria | Oct. 10, 1912 |
| 477,240 | Germany | Oct. 12, 1929 |
| 503,143 | Great Britain | Apr. 3, 1939 |
| 562,291 | France | Nov. 8, 1923 |